United States Patent Office 3,338,769
Patented Aug. 29, 1967

3,338,769
PROCESS FOR IMPROVING THE BOND BETWEEN REINFORCING YARNS AND AMORPHOUS TERNARY COPOLYMERS OF ETHYLENE, AN α-OLEFIN, AND A NONCONJUGATED POLYENE IN THE MANUFACTURE OF COMPOSITE RUBBER ARTICLES
Alfred Kühlkamp, Hofheim, Taunus, Erich Schmidt, Schonberg, Taunus, and Hans Dieter Stemmer, Hattersheim (Main), Germany, assignors to Hercules Incorporated, a corporation of Delaware
No Drawing. Filed Apr. 22, 1965, Ser. No. 450,193
Claims priority, application Germany, June 6, 1963, F 39,929
5 Claims. (Cl. 156—334)

In making yarn-reinforced rubber articles, the bond strength between the reinforcing yarn and ethylene-α-olefin unconjugated polyene rubber is increased by treating the yarn with an aqueous dispersion of a polymethylol phenol resin and an acrylamide grafted terpolymer of ethylene, an α-olefin, and an unconjugated polyene, drying the treated textile material at 140 to 240° C. to remove water and cure the resin, then embedding the same in the unvulcanized terpolymer and vulcanizing in the known manner.

This application is a continuation-in-part of our copending application Ser. No. 372,389, filed June 3, 1964 and now abandoned.

The present invention relates to a process for making rubber articles reinforced with textile yarns.

It is known to use for the reinforcement of many rubber articles textile yarns in the form of cord, thread, and the like of regenerated cellulose (known under the collective term "rayon"), nylon, polyesters, and similar materials.

It is important in such articles that the textile yarn adhere strongly to the vulcanized rubber. For this purpose, the textile is often treated, or impregnated, with an aqueous dispersion or solution of the unvulcanized rubber and a reactive polymethylolphenol resin either as such or produced, e.g., from resorcinol and formaldehyde, in situ. The pretreated yarn is then incorporated according to known processing methods into the rubber mixture, and after the vulcanization a firm bond is obtained between the yarn and the vulcanizate.

It is furthermore known to produce from monoolefins, e.g., from ethylene, another 1-olefin such as propylene or butene-(1) and a di- or triolefin, unsaturated, amorphous ternary copolymers of typical rubberlike character which can be vulcanized with sulfur and accelerators. Vulcanizates of these amorphous, unsaturated copolymers, which are prepared with addition of inactive or active carbon black or other fillers, and, if necessary, with addition of mineral oil as a processing aid or extender oil, distinguish themselves by good mechanical properties, a favorable low temperature behavior, good dynamic properties, and, particularly, by a high resistance to oxidative or thermal aging. The unsaturated, amorphous copolymers are obtainable, for instance, by the processes described in Belgian Patents 583,039 and 583,040, French Patent 1,207,-844, U.S. Patents 2,933,480, 3,000,866, and 3,093,620, and British Patent 880,904, with the use of organometallic mixed catalysts and contain 85–29 mole percent, preferably 70–50 mole percent, of ethylene, 14.5–70.5 mole percent, preferably 22–49 mole percent, of a second 1-olefin, and 0.5–20 mole percent, preferably 1–10 mole percent, of a polyene having 2 to 3 double bonds.

A plurality of dienes or trienes are suitable for the preparation of the unsaturated, amorphous copolymers, but those with unconjugated double bonds having 3 to 22 carbon atoms are preferred. Such compounds are, e.g.:

(a) acyclic dienes with terminal double bonds, such as propadiene, pentadiene-(1,4), 3-methylpentadiene-(1,4), 3,3-dimethylpentadiene-(1,4), hexadiene-(1,5), 2-methylhexadiene-(1,5), 3,3-dimethylhexadiene-(1,5)- octadiene-(1,7), decadiene-(1,9), dodecadiene-(1,11), and eicosadiene-(1,19);

(b) acyclic dienes with a terminal and a buried double bond, such as hexadiene-(1,4), heptadiene-(1,4), heptadiene-(1,5), 3-methylheptadiene-(1,5), 4-methylheptadiene-(1,5), octadiene-(1,5), octadecadiene-(1,9), 6-methylheptadiene-(1,5), 7-methyloctadiene-(1,6), 3,7-dimethyloctadiene-(1,6), 11-ethyltridecadiene-(1,11);

(c) cyclic dienes or trienes, such as 1,3,5-trivinylcyclohexane, 1,4-di-ω-butenylbenzene, and cyclooctadiene; and (d) endocyclic dienes, such as bicyclo-(2,2,1)-heptadiene-(2,5), 5-methylenebicyclo-(2,2,1)-heptene-(2), biscyclopentadiene, dimethyldicyclopentadiene, and biscyclo-(2,2,2)-octadiene-(2,5).

Independent of their chemical composition, the unsaturated, amorphous copolymers usable as rubber have the following typical properties:

| | Broad | Preferred |
|---|---|---|
| ηspec./0.1 measured in an Ubbelohde Viscosimeter I in decahydronaphthalene at 135° C. (g./l.) | 0.5–5.5 | 1–3 |
| Mooney viscosity (ASTM D 927–49T) ML (1+4) 100° C | 15–160 | 30–110 |
| Defometer hardness (DIN 53 514); 80° C | 15–5,000 | 400–2,000 |
| Iodine No. (addition of iodomono-chloride according to Kuppe) | 1.5–50 | 3–20 |

As mentioned before, the unsaturated amorphous copolymers can be vulcanized in a manner similar to the vulcanization of natural rubber with a sulfur/accelerator combination. Suitable accelerators include the known commercial ones of the dithiocarbamate class, e.g., zinc dimethyldithiocarbamate, or of the mercapto class, e.g., 2-mercaptobenzothiazole or N-cyclohexyl-2-benzothiazyl sulfene amide or of the thiuram class, e.g., tetramethylthiuram mono- or disulfide. Organic bases such as diphenylguanidine, morpholine, or morpholine disulfide can also be used as accelerators. Also, combinations of the different above-mentioned accelerators, e.g., the combination of tetramethylthiuran monosulfied with 2-mercaptobenzothiazole, are suitable.

It has now been found that the bond strength of textile yarns to vulcanizates of unsaturated, amorphous ternary copolymers of ethylene with another 1-olefin and an unconjugated polyene is increased considerably by the process comprising the steps of:

(1) Treating the textile yarn in the known way with an aqueous dispersion which contains (a) a polymethylol phenol resin prepared from phenol or a substituted phenol and formaldehyde, and
 (b) an acrylamide-grafter, unsaturated, amorphous ternary copolymer of ethylene with another 1-olefin and an unconjugated polyene with 3 to 22 carbon atoms;

(2) Embedding the pretreated textile yarn in a vulcanizable unsaturated, amorphous ternary copolymer of ethylene, a second 1-olefin, and an unconjugated polyene containing sulfur and an accelerator; and (3) Vulcanizing the resulting composite structure.

When, for example, the static bond strength of a rayon yarn embedded in one of the composite compounds prepared according to the above-described process is measured according to the method known as H-test described by Lyons, Conrad, and Nelson in Rubber Chem. and Techn. 20, 268 (1947), values of 9–12.5 kg./10 mm. bonding length are obtained at measuring temperatures of 20° C. and of 4–6 kg./10 mm. of bonding length at 120° C. Composite structure prepared by the same process but without the use of an acrylamide-grafted copolymer give in the H-test a bond strength of only 7–9 kg./10 mm. bonding length at 20° C. and only 3–4 kg./10 mm. of bonding length at 120° C.

Moreover, the present process permits the preparation of composite structures from textile yarns and saturated, amorphous copolymers of ethylene and propylene or butene-1 by applying to the layer of the vulcanizable mixture surrounding the textile inserts consisting of the unsaturated ternary copolymer a layer of a vulcanizable mixture of a saturated, amorphous copolymer of ethylene and propylene or butene-1 and vulcanizing the whole composite structure.

The acrylamide-grafted, unsaturated, amorphous ternary copolymers used in accordance with the invention are obtained from the above-mentioned ternary copolymers by processes such as described in Belgian Patent 619,525 by reacting the copolymers with acrylamide in the presence of free radical activators. The reaction can be carried out in inert solvents, such as benezene, chlorobenzene, or carbon tetrachloride. The grafting, however, is carried out preferably using aqueous dispersions of the copolymers, e.g., according to the process described in Belgian Patent 616,065. According to this process, the unsaturated copolymers are dissolved in a suitable organic solvent immiscible with water, e.g., hexane or benzene, the solution obtained is emulsified in water with addition of emulsifiers and emulsion stabilizers, whereupon the solvent is distilled off under normal or reduced pressure and the dispersion so obtained is creamed to the desired solids contents, if necessary with addition of a creaming agent. The solid contents of the dispersions should not go below 15% by weight since a dispersion of about 15–20% is best suited for textile preparation.

The amount of the grafted acrylamide can vary within wide limits, e.g., between 0.5 and 50% by weight, but it is preferably between 2.5 and 20% by weight of acrylamide, referred to the unsaturated copolymer.

For the preparation of the reactive polymethylol phenol resins are suitable, for example, according to M. W. Wilson, Adhesive Age, April 1961, pages 32–36, fundamentally all univalent or polyvalent unsubstituted or substituted phenols, such as, e.g., phenol itself, alkyl phenols, resorcinol, or pyrogallol, but a resinous condensate of resorcinol and formaldehyde is preferable. The latter is added to the aqueous copolymer dispersion either in the form of commercially obtainable precondensates with addition of more formaldehyde necessary for complete condensation of the aqueous copolymer dispersion or produced in situ at a pH-value of 7.5–9.5, preferably of 8–9, from resorcinol and formaldehyde in the copolymer dispersion.

The amount of the reactive polymethylol phenol resin used is 10–40% by weight, based on the unsaturated copolymer. The use of 15–25% by weight of resin is preferred, since with larger amounts the treated textile becomes so stiff that under certain circumstances its dynamic efficiency suffers and, on the other hand, at lower amounts of resin the bond strength is too low.

The formaldehyde/resorcinol ratio can vary within the limits of 1 to 4 moles of formaldehyde per mole of resorcinol, but is preferably 1.5–3 moles of formaldehyde per mole of resorcinol. When the dimethylol phenol resin is produced in situ, a ripening time for the resorcinol/formaldehyde/copolymer dispersion is necessary prior to its application to allow the resorcinol and formaldehyde to react to form the dimethylol phenol resin. This ripening time amounts to about 5–6 hours, but can be extended, without harmful effect on the bond strength, to 70–100 hours.

The complete condensation of the dimethylol phenol resin takes place during the drying of the prepared textile, which is carried out, preferably continuously in a drying tunnel, at 140–240° C. for from 20 minutes to 5 seconds, depending upon the temperature. The drying temperature and time depend upon the nature of the textile and of the processing method and are given here only as an example. Due to the pretreatment with the resin/copolymer dispersion, the textile yarn increases in weight. This increase is between 1 and 15% by weight, preferably 3 to 10% by weight, of the untreated textile, depending upon the kind of weave and thread and the retention time of the textile in the dispersion. Too high weight increases must be avoided, since otherwise the stiffness of the textile becomes too great. The $\eta$ spec./0.1 values given in the following examples were measured in an Ubbelohde Viscosimeter I in decahydronaphthalene at 135° C.

*Example 1*

A copolymer/dimethylol/phenol resin dispersion was prepared by using an aqueous dispersion of an unsaturated, amorphous copolymer, grafted with 15% by weight acrylamide, consisting of 54 mole percent of ethylene, 42.5 mole percent of propylene, and 3.5 mole percent of dicyclopentadiene with a $\eta$ spec./0.1=1.5 and a Mooney viscosity of 49 ML (1+4) 100° C. This dispersion was composed of the following constituents:

| | Parts by weight |
|---|---|
| Dispersion of the grafted copolymer (40% by weight solids) | 250 |
| Resorcinol | 13 |
| Formaldehyde solution (37.4% $CH_2O$) | 19 |
| Water | 318 |
| | 600 |

After mixing the invidual constituents in the order of water, resorcinol, formaldehyde solution and copolymer dispersion, the pH of the mixture was adjusted with a 2.5 N aqueous sodium hydroxide to 8.8 and the mixture allowed to ripen at a temperature of 20°. During the ripening time the resorcinol and formaldehyde condensed under the influence of the alkali to form a reactive dimethylol phenol resin, whereby the pH-value drops to 8.6.

After a ripening time of 18 hours, a high-tensile rayon yarn of 1650 deniers, two-ply, was dipped, while under a tensile stress of 200 g. into the copolymer/resin dispersion for about 10 seconds at 20° C. and dried under the same tension first for 30 minutes at a temperature of 20–25° C. and then for 15 minutes at 160° C. The yarn pretreated in this way underwent a weight increase of 8.1% (hereafter called "pick-up"). Thereafter 12 pretreated yarns were vulcanized under a tension of 250 g./yarn into a vulcanizable mixture of an unsaturated, amorphous copolymer of the following composition:

| | Parts by weight |
|---|---|
| Copolymer of 65 mole percent ethylene, 34 mole percent propylene, 1 mole percent dicyclopentadiene $\eta$ spec./0.1=1.8; Mooney viscosity=43 ML (1+4) 100° C. | 100.0 |
| HAF-carbon black | 15.0 |
| SRF-carbon black | 20.0 |
| Zinc oxide | 5.0 |
| Stearic acid | 1.0 |
| 2-mercaptobenzothiazole | 0.5 |
| Tetramethylthiuramdisulfide | 1.3 |
| Sulfur | 1.0 |

The vulcanization was finished after 50 minutes at 160° C. at a pressure of 20–25 kg./sq. cm. The test piece was a rubber bar 250 mm. long, 10 mm. wide and 8 mm. thick, from which at intervals of 20 mm. the yarn projected vertically to the longitudinal axis of the rubber bar on both sides. The one end of the yarn was cut flush with the surface of the rubber bar so that the yarns were embedded in the vulcanizate over a length of 10 mm. The force which was necessary to pull the yarn in the direction of its axis from the composite structure on these test pieces was measured in a tension tester at a crosshead speed of 100 mm./min. (H test). The testing temperature was 20° or 120° C. The static bond strength measured in this way was an average 9.7 kg./10 mm. at 20° and 4.5 kg./10 mml. at 120° C.

*Example 2.—a–v*

Rayon yarn was pretreated with a copolymer/resorcinol/formaldehyde resin dispersion according to Example 1 and vulcanized into a vulcanizable mixture of an unsaturated, amorphous copolymer, as described in Example 1. The composition of the starting copolymers used for the preparation of the copolymer dispersion, the content of grafted acrylamide and the bond strengths obtained with the use of the copolymer dispersions can be seen in the following table. The pick-up varied in all tests between 7 and 8.4%.

resin was added in the form of a commercial water-soluble precondensate of resorcinol and formaldehyde, which can be obtained under the name of Penacolite-resin B–1–A. The copolymer/resin dispersion contained the following constituents:

|  | Parts by weight |
|---|---|
| 40% dispersion of the acrylamide-grafted, amorphous copolymer | 250.0 |
| Aqueous resorcinol/formaldehyde precondensate solution (50%) | 25.8 |
| Formaldehyde solution (37.4% $CH_2O$) | 11.3 |
| Water | 384.0 |
|  | 621.1 |

TABLE.—CHARACTERIZATION OF THE UNGRAFTED, UNSATURATED COPOLYMER

| Diene or Triene | Diene or Triene mole, percent | Ethylene mole, percent | Propylene mole, percent | η Spec./ 0.1, g./l. | ML (1+4) 100° C. | Acrylamide content, percent by weight | H-Test (kg./10 mm) | |
|---|---|---|---|---|---|---|---|---|
|  |  |  |  |  |  |  | 20° | 120° |
| 3-methylpentadiene-(1,4) | 2 | 61 | 37 | 2.0 | 51 | 5 | 10.2 | 4.8 |
| Do | 2 | 61 | 37 | 2.0 | 51 | 20 | 9.2 | 4.3 |
| Hexadiene-(1,5) | 1 | 63 | 36 | 2.2 | 51 | 5 | 11.1 |  |
| Do | 1 | 63 | 36 | 2.2 | 51 | 10 | 11.4 | 5.2 |
| Do | 1 | 63 | 36 | 2.2 | 51 | 15 | 10.6 |  |
| Do | 2.1 | 56.9 | 41 | 1.6 | 44 | 10 | 11.0 | 5.2 |
| Do | 3.5 | 57.7 | 39 | 1.3 | 38 | 5 | 11.8 |  |
| Do | 3.5 | 57.7 | 39 | 1.3 | 38 | 10 | 12.1 | 5.9 |
| Do | 3.5 | 57.7 | 39 | 1.3 | 38 | 15 | 10.9 |  |
| 3-methylheptadiene-(1,5) | 1.5 | 41.5 | 57 | 1.9 | 46 | 2.5 | 10.2 |  |
| Do | 1.5 | 41.5 | 57 | 1.9 | 46 | 10 | 10.7 | 5.0 |
| 6-methylheptadiene-(1,5) | 1.9 | 61.1 | 37 | 1.3 | 40 | 5 | 11.3 | 5.3 |
| 11-ethyltridecadiene-(1,11) | 1.4 | 67.6 | 31 | 1.8 | 48 | 2.5 | 11.9 | 5.8 |
| Do | 1.4 | 67.6 | 31 | 1.8 | 48 | 5 | 12.3 | 6.0 |
| Do | 1.4 | 67.6 | 31 | 1.8 | 48 | 10 | 9.8 |  |
| Trivinylcyclohexane-(1,3,5) | 2.7 | 59.3 | 38 | 1.0 | 33 | 2.5 | 11.4 | 5.4 |
| Do | 2.7 | 59.3 | 38 | 1.0 | 33 | 5 | 10.8 |  |
| Bicyclo-[2,2,1]-heptadiene-(2,5) | 3.8 | 62.2 | 34 | 1.4 | 40 | 10 | 9.9 | 4.7 |
| Bis-cyclopentadiene | 1.3 | 67.1 | 31.6 | 1.6 | 45 | 2.5 | 12.3 | 5.8 |
| Do | 1.3 | 67.1 | 31.6 | 1.6 | 45 | 5 | 12.5 | 5.9 |
| Do | 1.3 | 67.1 | 31.6 | 1.6 | 45 | 10 | 11.2 | 5.1 |

*Example 3.—a–i*

Rayon yarns pretreated according to Example 2u were vulcanized into unsaturated, amorphous copolymers of various composition, as described in Example 1. The structure of the mixture corresponded to the data given in Example 1 except for the nature of the copolymer used. The vulcanization was carried out likewise in the same way as in Example 1. The composition of the copolymers and the static bond strength obtained are given in the following table.

The pH-value was adjusted to 8.8 by means of a 25% ammonia solution. The total solids content of the copolymer/resin dispersion was about 17.2% by weight. After a ripening time of 18 hours at 20° C., a high-tensile rayon yarn, 1650 deniers, 2-ply, was pretreated according to Example 1 with the copolymer/resin dispersion and vulcanized into a vulcanizable rubber mixture of the same ethylene/butene-1/dicyclopentadiene copolymer as used for the preparation of the acrylamide-grafted copolymer dispersion. The formulation of the rubber mixture and the

TABLE

| Diene or Triene | Diene or Triene mole, percent | Ethylene mole, percent | Propylene mole, percent | η Spec. 0.1 (g./l.) | ML (1+4) 100° C. | H-Test 20° (kg./10 mm.) |
|---|---|---|---|---|---|---|
| 3-methylpentadiene-(1,4) | 2 | 61 | 37 | 2.0 | 51 | 10.7 |
| Hexadiene-(1,5) | 2.1 | 56.9 | 41 | 1.6 | 44 | 10.9 |
| 3-methylheptadiene-(1,5) | 1.3 | 75.7 | 23 | 2.7 | 68 | 12.1 |
| Do | 1.5 | 41.5 | 57 | 1.9 | 46 | 11.2 |
| 6-methylheptadiene-(1,5) | 1.9 | 61.1 | 37 | 1.3 | 40 | 11.8 |
| 11-ethyltridecadiene-(1,11) | 1.4 | 67.6 | 31 | 1.8 | 48 | 11.8 |
| Do | 1.4 | 82.6 | 16 | 2.3 | 73 | 9.3 |
| Trivinylcyclohexane-(1,3,5) | 2.7 | 59.3 | 38 | 1.0 | 33 | 9.7 |
| Bicyclo-[2,2,1]-heptadiene-(2,5) | 3.8 | 62.2 | 34 | 1.4 | 40 | 10.1 |

*Example 4*

A copolymer/dimethylol phenol resin dispersion was prepared using an aqueous dispersion of an unsaturated, amorphous copolymer, grafted with 6% by weight of acrylamide, consisting of 59.8 mole percent of ethylene, 38 mole percent of butene-1, and 2.2 mole percent of dicyclopentadiene with a η spec./0.1=1.9 and a Mooney viscosity of 47 ML (1+4) 100° C. The dimethylol phenol vulcanization conditions were the same as in Example 1. The determination of the bond strength by the H-test gave at 20° C. test temperature 11.8 kg./10 mm. and at 120° C. 5.6 kg./10 mm.

*Example 5*

A copolymer/dimethylol phenol resin dispersion was prepared according to Example 1 using an aqueous dispersion of an unsaturated, amorphous copolymer, grafted with 5% by weight of acrylamide, consisting of 54 mole percent of ethylene, 42.5 mole percent of propylene, and 3.5 mole percent of dicyclopentadiene with a $$\eta \text{ spec.}/0.1 = 1.5$$

and a Mooney viscosity of 49 ML (1+4) 100° C. The composition of the dispersion was as follows:

| | |
|---|---:|
| Dispersion of the grafted copolymer (37.5% by weight solids) _____ g__ | 1600 |
| Resorcinol _____ g__ | 78 |
| Formaldehyde solution (37.4% CH$_2$O) _____ cc__ | 114 |
| Water _____ cc__ | 2358 |
| Sodium hydroxide (10% aqueous) _____ cc__ | 75 |

The pH-value of the copolymer/resin dispersion was 8.8, after 18 hours of ripening 8.6. The viscosity was 22 centipoises and the total solids content was 17.5% by weight. A rayon yarn, 1650 deniers, 2-ply, was treated with this dispersion on a continuous installation at a thread tension of 300 g., a thread velocity of 4.6 m./min. and a residence time of 120 sec. in a drying tunnel heated to 220° C. This pick-up was 6.3% by weight. The rayon yarn pretreated in this way was vulcanized into a rubber mixture of the following composition at 160° C. for 50 min.

| | Parts by weight |
|---|---:|
| Copolymer of 67.1 mole percent of ethylene, 31.6 mole percent of propylene, 1.3 mole percent of dicyclopentadiene, $\eta$ spec./0.1=1.6; Mooney viscosity=45 ML (1+4) 100° _____ | 27.0 |
| Coplymer of 66.2 mole percent of ethylene, 32.5 mole percent of propylene, 1.3 mole percent of dicyclopentadiene, $\eta$ spec./0.1=2.5; Mooney viscosity=112 ML (1+4) 100° _____ | 53.0 |
| Naphthenic mineral oil, nondiscoloring viscosity-gravity constant=0.870 _____ | 20.0 |
| HAF-carbon black _____ | 15.0 |
| SRF-carbon black _____ | 20.0 |
| Zinc oxide _____ | 3.0 |
| Tetramethylthiuram disulfide _____ | 1.3 |
| Sulfur _____ | 1.0 |

The bond strength determined in the H-test was 9.7 kg./10 mm. at a testing temperature of 20° C. and 5.2 kg./10 mm. at 120° C.

*Example 6*

Nylon tire yarn (1260/2) was dipped while under a tensile stress of 200 g. into the copolymer/dimethylol phenol resin dispersion of Example 1 for about 10 seconds at 20° C. and dried under the same tension for 30 minutes at 25° C. and then for 15 minutes at 160° C. The yarn had a weight increase of about 8%. Thereafter 12 of the pretreated yarns were embedded under a tension of 250 g. per yarn in a vulcanizable mixture of the following composition:

| | Parts by weight |
|---|---:|
| Copolymer of 65 mole percent of ethylene 33 mole percent propylene and 2 mole percent dicyclopentadiene ($\eta$ spec./0.1=1.9) _____ | 100 |
| HAF carbon black _____ | 80 |
| Zinc oxide _____ | 3 |
| Naphthenic extending oil _____ | 42 |
| Mercaptobenzothiazole _____ | 1.75 |
| Tetramethylthiuram disulfide _____ | 1.5 |
| Sulfur _____ | 1 |

After vulcanizing 50 minutes at 160° C. as in Example 1, an H-test value and about 23 lbs./10 mm. at 23° C. was obtained.

What we claim and desire to protect by Letters Patent is:

1. Process for the preparation of composite rubber articles from rayon, nylon, or polyester yarns and unsaturated, amorphous ternary copolymers of ethylene, a second 1-olefin, and a nonconjugated polyene with 3 to 22 carbon atoms comprising the steps of
    (1) wetting the yarn with an aqueous dispersion and then drying the yarn at 140–240° C., said aqueous dispersion containing
        (a) an unsaturated, amorphous terniary copolymer of 85–29 mole percent ethylene, 14.5–70.5 mole percent of propylene of butene-1, and 0.5–20 mole percent of a nonconjugated polyene with 3 to 22 carbon atoms that has been grafted with 0.5–50 percent by weight of acrylamide, and
        (b) a polymethylol phenol resin prepared from a phenol and formaldehyde, said resin comprising from 10 to 40 percent by weight of (a);
    (2) embedding the pretreated yarn in a vulcanizable mixture of an unsaturated, amorphous, ternary copolymer as defined in (a) above and vulcanizing agent; and
    (3) vulcanizing the composite article resulting from step (2).

2. Process according to claim 1 in which the polymethylol phenol resin is formed in situ from resorcinol and formaldehyde.

3. Process according to claim 1 in which the polymethylol phenol resin is added in the form of a water-soluble precondensate of resorcinol and formaldehyde to the aqueous dispersion of the arcylamide-grafted unsaturated copolymer.

4. Process according to claim 1 in which the textile yarn is rayon yarn.

5. Process according to claim 1 in which the textile yarn is nylon yarn.

References Cited

UNITED STATES PATENTS

| | | | |
|---|---|---|---|
| 2,643,207 | 6/1953 | Entwistle | 260—17.2 |
| 3,000,866 | 9/1961 | Tarney | 260—80.5 |

FOREIGN PATENTS

| | | |
|---|---|---|
| 1,326,931 | 4/1963 | France. |
| 613,931 | 12/1948 | Great Britain. |

WILLIAM H. SHORT, *Primary Examiner.*

E. M. WOODBERRY, *Assistant Examiner.*

UNITED STATES PATENT OFFICE
CERTIFICATE OF CORRECTION

Patent No. 3,338,769                                    August 29, 1967

Alfred Kühlkamp et al.

It is hereby certified that error appears in the above numbered patent requiring correction and that the said Letters Patent should read as corrected below.

Column 8, line 20, for "terniary" read -- ternary --; column 8, line 23, for "of butene-1" read -- or butene-1 --.

Signed and sealed this 30th day of July 1968.

(SEAL)
Attest:

Edward M. Fletcher, Jr.                           EDWARD J. BRENNER
Attesting Officer                                      Commissioner of Patents